(12) United States Patent
Xie et al.

(10) Patent No.: US 8,093,340 B2
(45) Date of Patent: Jan. 10, 2012

(54) HIGH STRENGTH REVERSIBLE NONCOVALENT ADHESION METHODS FOR A SOLID POLYMER-POLYMER INTERFACE

(75) Inventors: Tao Xie, Troy, MI (US); Ruomiao Wang, Warren, MI (US); Xingcheng Xiao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 217 days.

(21) Appl. No.: 12/178,844

(22) Filed: Jul. 24, 2008

(65) Prior Publication Data

US 2010/0022710 A1  Jan. 28, 2010

(51) Int. Cl.
*C08G 59/50* (2006.01)
*C08L 63/02* (2006.01)

(52) U.S. Cl. .................... 525/523; 528/120; 528/123

(58) Field of Classification Search .................... None
See application file for complete search history.

(56) References Cited

U.S. PATENT DOCUMENTS

| | | | |
|---|---|---|---|
| 5,755,913 A | 5/1998 | Liaw et al. | |
| 6,759,481 B2 | 7/2004 | Tong | |
| 6,773,535 B1 | 8/2004 | Wetzel | |
| 6,827,325 B2 | 12/2004 | Hofmann et al. | |
| 6,986,855 B1 | 1/2006 | Hood et al. | |
| 7,188,498 B2 | 3/2007 | Browne et al. | |
| 2001/0047579 A1 | 12/2001 | Lee et al. | |
| 2005/0151385 A1 | 7/2005 | Autumn et al. | |
| 2005/0167556 A1 | 8/2005 | Fontana et al. | |
| 2005/0240190 A1 | 10/2005 | Gall et al. | |
| 2005/0274455 A1 | 12/2005 | Extrand | |
| 2006/0036045 A1 | 2/2006 | Wilson et al. | |
| 2006/0156535 A1 | 7/2006 | Browne et al. | |
| 2007/0073130 A1 | 3/2007 | Finch et al. | |
| 2007/0289786 A1 | 12/2007 | Cutkosky et al. | |

FOREIGN PATENT DOCUMENTS

CN 101195701 A * 6/2008
JP 2007-197503 A * 8/2007

OTHER PUBLICATIONS

Li et al., "Shape memory effect of polyethylene/nylon 6 graft copolymers," Polymer, vol. 39, No. 26, 1998, pp. 6929-6934.*
HCAPLUS accession No. 2008:153218, Lei et al., "Study on properties of reactive compatibilization of HDPE/PA66/POE-g-MAH blend alloy," Suliao Keji, vol. 36, No. 11, 2008, two pages.*
HCAPLUS accession No. 2008:151536, Huang et al., "Effect of SMA compatibilizer on property of PA6/PP alloy and compatibilizing mechanism," Huagong Xinxing Cailiao Bianjibu, vol. 35, No. 11, 2007, one page.*
Xiao, U.S. Appl. No. 12/273,083, Self-Healing and Scratch Resistant Shape Memory Polymer System, filed Nov. 18, 2008.
Xie, U.S. Appl. No. 11/867,531, Reversible Dry Adhesives, filed Oct. 4, 2007.
Xie, U.S. Appl. No. 12/396,045, Polymer Systems with Multiple Shape Memory Effect, filed Mar. 2, 2009.
Xie, U.S. Appl. No. 12/367,826, A Reversible Welding Process for Polymers, filed Feb. 9, 2009.
Xie, U.S. Appl. No. 12/178,844, High Strength Reversible Noncovalent Adhesion Methods for a Solid Polymer-Polymer Interface, filed Jul. 24, 2008.
Cheng, U.S. Appl. No. 12/359,709, Remote Activation of Thermo-Reversible Dry Adhesives, filed Jan. 26, 2009.
Xie, U.S. Appl. No. 12/423,947, Shape Memory Polymer and Adhesive Combination and Methods of Making and Using the Same, filed Apr. 15, 2009.
Xie, U.S. Appl. No. 12/432,211, Shape Memor Polymers with Surface Having Dangling Adhesive Polymeric Chains and Methods of Making and Using the Same, filed Apr. 29, 2009.
Xie, U.S. Appl. No. 12/181,562, Polymer Systems with Multiple Shape Memory Effect, filed Jul. 29, 2008.
Xie, U.S. Appl. No. 11/867,549, Method of Miniimizing Residue Adhesion for Thermo-Reversible Dry Adhesives, filed Oct. 4, 2007.
Xie, U.S. Appl. No. 12/105,865, Attachment Pad with Thermal Reversible Adhesive and Methods of Making and Using the Same, filed Apr. 18, 2008.
Xie, U.S. Appl. No. 11/867,558, Multilayer Adhesive for Thermal Reversible Joining of Substrates, filed Oct. 4, 2007.
Xie, U.S. Appl. No. 12/391,704, Reversible Dry Adhesives for Wet adn Dry Conditions, filed Feb. 24, 2009.
Xie, U.S. Appl. No. 12/105,749, Method for Robotic Handling Using Thermo-Reversible Dry Adhesives, filed Apr. 18, 2008.
Xie, U.S. Appl. No. 12/105,788, Climbing Devices Based on Thermo-Reversible Dry Adhesives, filed Apr. 18, 2008.
Xie, U.S. Appl. No. 11/867,588, Shape Memory Epoxy Polymers, filed Oct. 4, 2007.

* cited by examiner

*Primary Examiner* — Robert Sellers
(74) *Attorney, Agent, or Firm* — Reising Ethington P.C.

(57) ABSTRACT

A reversible adhesive system for coupling together two objects may consist of two shape memory polymers with molecular "hooks and loops" on the surfaces (i.e. the surface away from each of the objects). Utilizing the shape memory properties of the polymers, the molecular hooks and molecular loops may be brought together to form non-covalent bonds, leading to macroscopic adhesion. Upon heating, the adhesive bond can be separated with a small peeling force. The adhesive bonding and debonding can be repeated for multiple cycles with significant adhesion retention.

19 Claims, 2 Drawing Sheets

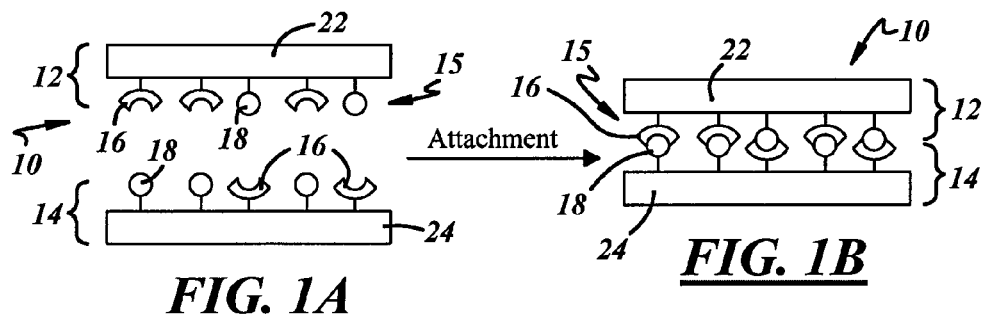
FIG. 1A  FIG. 1B
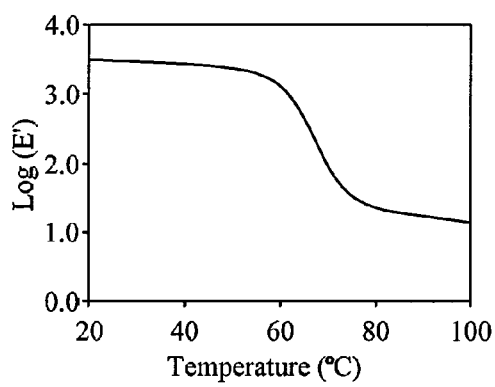
FIG. 3
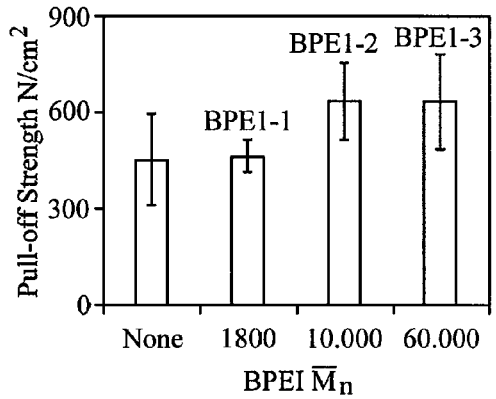
FIG. 5
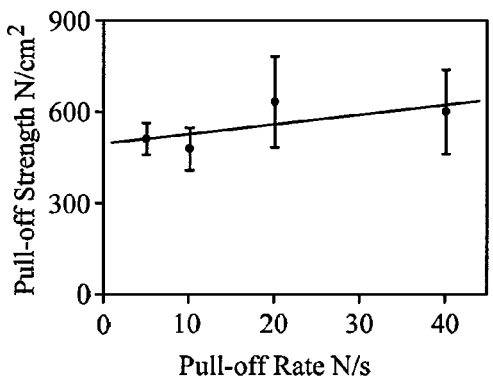
FIG. 6
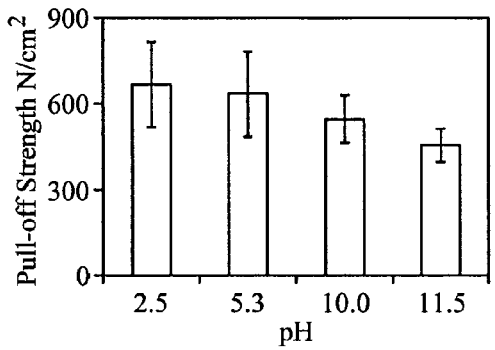
FIG. 7

US 8,093,340 B2

HIGH STRENGTH REVERSIBLE NONCOVALENT ADHESION METHODS FOR A SOLID POLYMER-POLYMER INTERFACE

TECHNICAL FIELD

The field to which the disclosure generally relates includes polymer chain adhesion methods and more specifically to a high strength, reversible adhesion method for a solid polymer-polymer interface.

BACKGROUND

Hook and loop fasteners such as Velcro® are well known ways for mechanically fastening together two separate objects or things without the use of an adhesive like glue. These fasteners including a hook portion coupled to one of the two objects and a loop portion coupled to the other of the two objects. To fasten the objects together, simply press the hook portion into the loop portion. An interesting characteristic of hook and loop fasteners is that the mechanical bonds created are relatively strong if one attempts to pull apart the hook portion in a direction perpendicular to the loop portion, while the mechanical bonds are less strong if one simply peels the hook portion away from the loop portion in a direction not perpendicular to the loop portion.

By contrast, conventional chemical bonding allows objects or things to be coupled together by applying an adhesive between the two surfaces that cures to couple together the two objects. The objects are bonded together by curing the adhesive. This creates essentially an irreversible bond between the objects (i.e. the bond cannot subsequently be debonded and bonded for multiple cycles).

SUMMARY OF EXEMPLARY EMBODIMENTS OF THE INVENTION

A reversible adhesive system for coupling together two objects may consist of two shape memory polymers with molecular "hooks and loops" on the surfaces (i.e. the surface away from each of the objects). Utilizing the shape memory properties of the polymers, the molecular hooks and molecular loops may be brought together to form non-covalent bonds, leading to macroscopic adhesion. Upon heating, the adhesive bond can be separated with a small peeling force. The adhesive bonding and debonding can be repeated for multiple cycles with significant adhesion retention.

In one exemplary embodiment, the non-covalent bonding may be achieved wherein both shape memory polymers contain hydrogen bonding moieties on their surfaces. Thus, multiple hydrogen bonds may be formed at the interface that leads to adhesion between the respective surfaces. As the temperature increases above the transition temperatures of the shape memory polymers, they become soft (significant modulus drop), which allows the adhesive bond to be separated in a peeling mode. In the peeling separation mode, the interfacial adhesion force is overcome gradually. Therefore, only a small peeling force is needed for bond separation. In the absence of an increased temperature, a significant amount of peel strength is necessary to break the same hydrogen bonds due to the rigidity of the shape memory polymers.

In another exemplary embodiment, the non-covalent bonding may be achieved wherein the first shape memory polymer contains positive charges on its surface, while the second shape memory polymer contains negative charges on its surface. Thus, ionic bonds may be formed that leads to adhesion between the respective surfaces.

In still another exemplary embodiment, the non-covalent bonding may be achieved wherein the first shape memory polymer and second shape memory polymer surfaces contain aromatic moieties that are capable of aromatic interaction, otherwise known as $\pi$-$\pi$ interaction.

In yet another exemplary embodiment, the non-covalent bonding can result from weak intermolecular interactions, collectively referred to as van der Waal forces, between molecules on the first shape memory polymer and second shape memory polymer side chains.

In a further exemplary embodiment, the non-covalent bonding between the respective side chains can result from any combination of the above listed non-covalent bonding interactions.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein:

FIG. 1A is an illustration of a generic exemplary embodiment of a reversible chemical adhesive system in an uncoupled form;

FIG. 1B is an illustration of a reversible chemical adhesive system of FIG. 1A in a coupled form;

FIG. 3 is a dynamic mechanical analysis curve for the cured epoxy shape memory polymer backbone of FIG. 2;

FIG. 5 is a graphical illustration of the pull-off strengths of various epoxy BPEI based epoxy shape memory polymers in accordance with one or more exemplary embodiments;

FIG. 6 is a graphical illustration of the impact of pull-off rate on pull-off strength for a BPEI-3 based epoxy shape memory polymer according to one exemplary embodiment; and FIG. 7 is a graphical illustration of the pull-off strength for the BPEI-3 based epoxy shape memory polymer according to one exemplary embodiment as a function of pH.

DETAILED DESCRIPTION OF EXEMPLARY EMBODIMENTS

Figure 2:
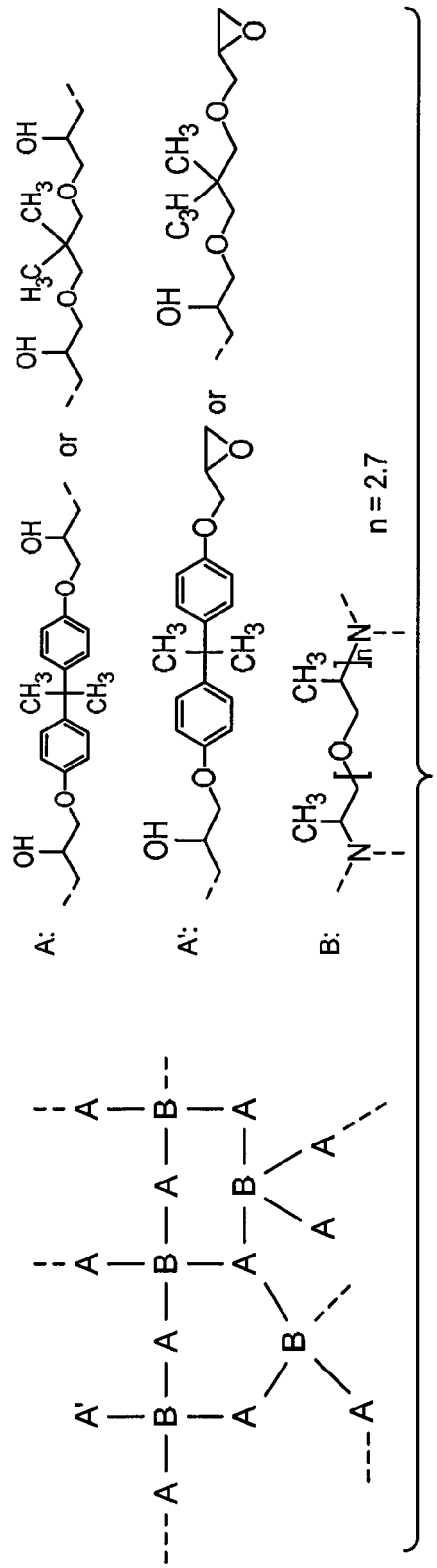
FIG. 2 is a two-dimensional illustration of the bonding of a portion of a reversible chemical adhesive system according to one exemplary embodiment.

The following description of the embodiment(s) is merely exemplary (illustrative) in nature and is in no way intended to limit the invention, its application, or uses.

Referring now to FIGS. 1A and 1B, a generic embodiment of the principles of a reversible chemical adhesive system 10 may be illustrated in an uncoupled and a coupled position.

The reversible chemical adhesive system 10 may be formed by reversibly coupling together a first polymeric chain 12 (i.e. polymer 12) and a second polymeric chain 14 (i.e. polymer 14) using a series of molecular hooks 16 and molecular loops 18.

The molecular hooks 16 and molecular loops 18 represent side chains 15 coupled onto one or both of the polymeric backbone portions 22, 24 of the first polymeric chain 12 and second polymeric chain 14, respectively, that will reversibly interact with one another (i.e. a molecular hook 16 on the first polymeric chain 12 will interact with a molecular loop 18 on the second polymeric chain 14, and/or alternatively a molecular loop 18 on the first polymeric chain 12 will interact with a molecular hook 16 on the second polymeric chain 14) to create a non-covalent bond of varying adhesive strength.

The polymeric backbones 22, 24 of the first polymeric chain 12 and second polymeric chain 14, respectively, in one exemplary embodiment, may be formed from shape memory polymers (SMPs). SMPs represent responsive polymers that can fix to deformed temporary shapes and recover to their permanent (original) shapes only upon external stimuli. SMPs may be available exhibiting a dual shape memory effect (DSME), wherein the SMP can only memorize one temporary shape in addition to its permanent shape in each shape memory cycle. It is also contemplated that SMPs may be available exhibiting a triple shape memory effect (TSME) or greater, wherein the SMP can memorize two distinct temporary shapes (for a TSME) or more in addition to its permanent shape in each memory cycle.

In general, to transform an SMP from its permanent shape to its temporary shape, the permanent shape may be heated to a first elevated temperature and then deformed under stress to yield the first temporary shape, a shape which may be different in visual appearance from the permanent shape. By definition, the first elevated temperature is a temperature sufficiently high to ensure a phase transition of the SMP (i.e. is a temperature above the glass transition temperature ($T_g$) of SMP). The SMP may then be cooled under stress to a temperature below the glass transition temperature of one SMP, wherein the stress may be relieved while maintaining the first temporary shape. To recover the permanent shape from the first temporary shape, the SMP may be reheated to the first elevated temperature in the absence of stress.

The ability of an SMP to change between its original permanent shape and at least one temporary shape allows the intimate contact of the molecular hooks 16 and molecular loops 18 on polymers 12 and 14. Thus, more or less non-covalent interactions between molecular hooks 16 of one of the polymeric backbones 22 or 24 and molecular loops 18 on the other of the polymeric backbones 22 or 24 may occur. A higher degree of non-covalent interactions may result in stronger bonding between the first polymeric chain 12 and the second polymeric chain 14. Conversely, a lower degree of non-covalent interactions may result in weaker bonding. Thus, by changing one, or the other, or both of the shape memory polymeric backbones 22, 24 from their original permanent shape to a deformed temporary shape, the amount of non-covalent interactions (and hence the bond strength) between the respective molecular hooks 16 and molecular loops 18 of the polymeric backbones 22, 24 available for coupling the chains 12, 14 together may be altered in a predictable manner.

The polymeric system 10 may be formulated such that the maximum amount of non-covalent bonding between the respective side chains 15 (i.e. a maximum amount of interaction occurs between the molecular hooks 16 of one polymeric chain 12 with the molecular loops 18 of the other polymeric chain 14) occurs when each of the shape memory polymeric backbones 22, 24 is in their respective temporary states and such molecular interaction is maintained after cooling due to the ability of shape memory properties of polymers 12 and 14. Further, an intermediate amount of non-covalent bonding occurs when one of the shape memory polymeric backbones 22 or 24 is in its respective temporary shape, while the other of the shape memory polymeric backbones in its original permanent state. Thus, it may be preferable wherein the glass transition temperature of the shape memory polymeric backbone 22 is sufficiently different than the glass transition temperature of the shape memory polymeric backbone 24 to allow precise control over the amount of non-covalent bonding between the respective polymers 12 and 14.

The side chains 15 coupled onto the shape memory polymeric backbones 22, 24 on the polymers 12, 14 that provide the molecular hooks 16 and molecular loops 18 may take on many different forms as described in the exemplary embodiments below. These different forms therein provide one or more kinds of non-covalent interactions that therefore for bonds between the molecules of varying strength.

For example, the non-covalent bonding may be achieved wherein the side chain 15 of the polymeric chain 12 and 14 both contain hydrogen bonding moieties (both hydrogen bonding acceptors and donors). In another exemplary embodiment, the side chain 15 of the first polymeric chain 12 includes hydrogen bonding acceptors as the molecular hooks 16 and hydrogen bonding acceptors donors as the molecular loops 18 on its surface, while the side chain 15 of the second polymeric chain 14 includes hydrogen bonding donors as the molecular loops 18 and hydrogen bonding acceptors as molecular hooks 16 on its surface.

Thus, multiple hydrogen bonds may be formed between the respective hooks 16 on one of the side chains 15 of the polymer chain 12 or 14 and loops 18 on a side chain 15 of the other of the polymer chains 12 or 14 that may lead to adhesion between the respective surfaces. As the moduli of polymers 12 and 14 drop significantly when temperature is increased above the shape memory polymer transition temperature, the surfaces can be debonded by simply increasing the temperature to a temperature above the glass transition temperature of each SMP chain 12, 14 and peeling one polymeric backbone 22 away from the other polymeric backbone 24. In the absence of increased temperature (i.e. when the polymer chains 12, 14 are in their stressed temporary shape), a significant amount of peel strength is necessary to break the same hydrogen bonds. Moreover, the amount of force necessary to break the hydrogen bonds by moving the polymeric backbone 22 in a direction substantially normal with respect to the polymeric backbone 24 may be sufficiently greater than the amount of force to peel the polymeric backbone 22 with respect to the polymeric backbone 24.

Alternatively, the non-covalent bonding may be achieved wherein the side chain 15 of one of the polymer chains 12 or 14 includes positive charges (i.e. the side chain 15 may be a positively charged molecule) as the molecular hooks 16 on its surface, while one of the side chains 15 of the other polymer chain 12 or 14 includes negative charges (i.e. the side chain 15 may be a negatively charged molecule) as the molecular loops 18 on its surface. In yet another exemplary embodiment, the side chain 15 of both of the polymer chains 12, 14 includes positive charges as the molecular hooks 16 and negative charges as the molecular loops 18 on its surface.

Thus, ionic bonds may be formed between the positively charged molecule of one side chain 15 and the negatively charged molecule of another side chain 15 that leads to adhesion between the respective surfaces of the first polymer chain 12 and the second polymer chain 14. Similar to hydrogen bonding, the ionic bonds on the surfaces may be debonded by simply peeling one polymeric backbone 22 away from the other polymeric backbone 24, especially when thermally activated above the glass transition temperatures of each SMP chain 12, 14. A significantly greater force may be necessary to break the ionic bonds by moving the polymeric backbone 22 in a direction substantially normal with respect to the polymeric backbone 24.

Non-covalent bonding may also be achieved wherein adhesion occurs as a result of both ionic bonding and hydrogen bonding. Thus, the side chains 15 of both the first polymeric chain 12 and the second polymeric chain 14 may have any of an infinitely available combination of side chains constituting positive charges, negative charges, hydrogen bond acceptors, and hydrogen bond donors. In any of these exemplary embodiments, the non-covalent bonds may be more easily broken by peeling the polymeric backbone 22 relative to the polymeric backbone 24, as opposed to moving the polymeric backbone 22 in a direction substantially normal with respect to the polymeric backbone 24, after heating the SMP chains 12, 14 above their respective glass transition temperatures.

Non-covalent interactations may also be achieved when the side chains 15 include organic compounds containing aromatic moieties. Aromatic interaction (or π-π interaction) between the side chains 15 of the first polymeric chain 12 and the second polymeric chain 14 may thus occur. π-π interactions are caused by intermolecular overlapping of p orbitals in π-conjugated systems, so they become stronger as the number of π-electrons increases.

In addition, the composition and relative orientations of the molecules of the side chains 15 may provide other forms of intermolecular interactions, collectively referred to as van der Waals forces, which may contribute to non-covalent interactions. The name van der Waals force refers to the attractive or repulsive forces between molecules (or between parts of the same molecule) other than those due to covalent bonds or to the electrostatic interaction of ions with one another or with neutral molecules forces. Van der Waals forces include momentary attractions between molecules, diatomic free elements, and individual molecules. Van der Waals forces are relatively weak compared to normal chemical bonds. Examples of types of van der Waal forces that may occur include dipole-dipole interactions, dipole-induced dipole forces, and London forces.

In either of these additional exemplary embodiments, similar to the other embodiments described above, the amount of non-covalent interactions may be tailored to be maximized when each of the polymer chains 12, 14, is in their first temporary shape. Moreover, the non-covalent bonds may be more easily broken by peeling the polymeric backbone 22 relative to the polymeric backbone 24, as opposed to moving the polymeric backbone 22 in a direction substantially normal with respect to the polymeric backbone 24, after heating the SMP chains 12, 14 above their respective glass transition temperatures.

In further exemplary embodiments, the non-covalent bonding between the respective side chains can result from any combination of the above listed non-covalent bonding interactions. Thus, the first polymer chain 12 and second polymer chain 14 may include side chains 15 that provide hydrogen bond donors and acceptors for hydrogen bonding, positively and negatively charged molecules for ionic bonding, aromatic moieties for π-π interactions, or other components that induce van der Waal forces, or any combination thereof. Thus, by transforming either the first polymer chain 12, or the second polymer chain 14, or both chains, from their respective permanent shapes to temporary shapes, the amount of non-covalent interactions may be precisely controlled and understood. Further, by increasing the temperature after coupling above the glass transition temperatures of each SMP chain 12, 14, the chains can be uncoupled by a simple peeling mechanism with little force.

EXPERIMENTAL

In one exemplary embodiment, a chemical system exhibiting shape memory effect was synthesized that included a branched polyethyleneimine (BPEI) polymer of varying molecular weights grafted onto a crosslinked epoxy SMP backbone.

The crosslinked epoxy SMP backbone formulation contained an aromatic diepoxide, an aliphatic diepoxide, and an aliphatic diamine as a curing agent, with the total amount of epoxide being six mole percent in excess. The actual materials utilized, synthesis, and testing of the materials is described further below.

The cured epoxy SMP backbone exhibited a tightly crosslinked nature, as shown in FIG. 2, with little possibility of chain entanglement due to the fact that the only free chain ends of the network are short monoepoxide segments A' (MW of 341 or 247). In addition, the cured epoxy SMP backbone was expected to exhibit shape memory properties, as illustrated in a dynamic mechanical analysis curve as shown in FIG. 3, with a glass transition temperature of about 68 degrees Celsius. Further, examination of the polymer structure revealed it contained both hydrogen bond donors (hydrogen atoms on the hydroxyl groups of segments A and A', respectively) and hydrogen bond acceptors (all the nitrogen and oxygen atoms in the epoxy structure).

Figure 4:
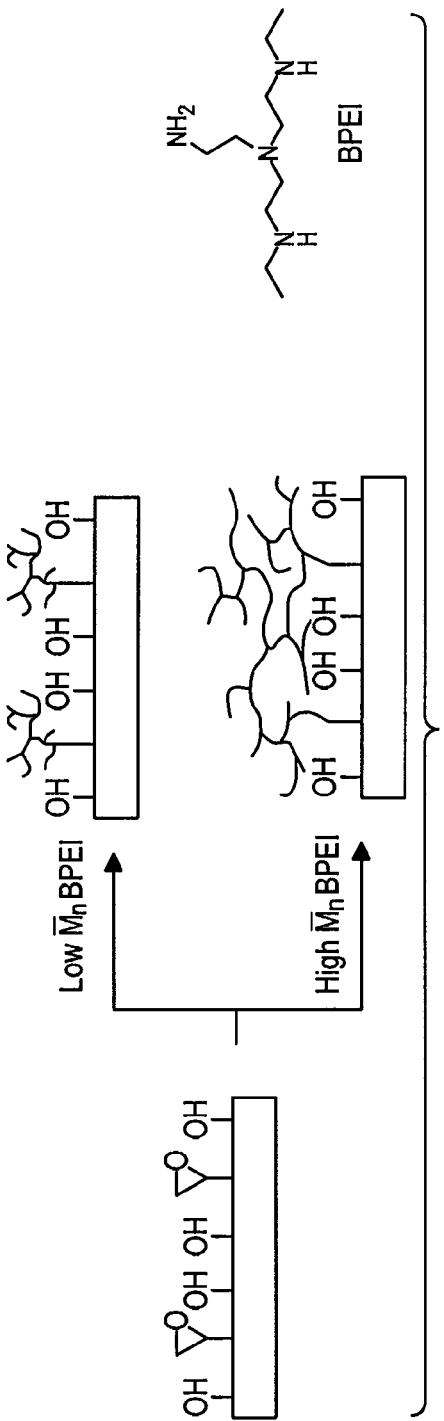
FIG. 4 is a two-dimensional illustration of two epoxy shape memory polymers grafted with low molecular weight and high molecular weight BPEI, respectively.

Next, three BPEI polymers (hereinafter the copolymers created are designated BPEI-1, BPEI-2, and BPEI-3) with molecular weights of 1,800; 10,000; and 60,000 were grafted onto the crosslinked epoxy SMP backbone resin by reacting the active hydrogens coupled to the nitrogen on the BPEI polymers with the unreacted epoxy rings on the crosslinked epoxy backbone structure. Since unreacted epoxy rings are randomly distributed on the backbone and the reactive hydrogen atoms are densely populated on the BPEI molecule, as shown in FIG. 4, each BPEI molecule may react only once where the molecular weight of BPEI is low, or multiple times in the BPEI molecular weight is sufficiently high. These facts were confirmed by atomic force microscopy height imaging on the non-grafted and grafted BPEI epoxy polymers and by nitrogen atomic percentages as obtained by x-ray photoelectron spectroscopy analysis.

Since BPEI is a partially ionized polymer (with the degree of ionization being pH dependent), BPEI polymers grafted onto the SMP epoxy backbone introduced hydrogen bonds and ionic bonds to the copolymer. The adhesive strength (i.e. pull-off strength) of crosslinked epoxy SMP polymers having BPEI side chains, wherein the polymer is stressed to its first temporary shape, as summarized in FIG. 5 increased to about 636 N/cm$^2$ for BPEI-2 and BPEI-3, as compared with 436 N/cm$^2$ for the ungrafted epoxy crosslinked SMP polymer and for BPEI-1. The increase in adhesive strength in BPEI-2 and BPEI-3 is attributed to nearly full surface coverage, and due to the fact that the hydrogen bond donors and acceptors on the epoxy polymers are buried beneath the BPEI grafts.

In addition, as shown in FIG. 6, the measured adhesion did not vary greatly with the pull-off rate used during adhesion tests, with only an 18-percent increase in adhesive strength experienced for crosslinked epoxy SMP polymers having BPEI-3 side chains (stressed to their first temporary shape) as the pull off rate increased from about 5 to 40 N/s. Further, as shown in FIG. 7 for BPEI-3, a slightly higher adhesion strength was experienced at lower pH due to more contribution from ionic interactions. At the higher pH of 11.5, the degree of ionization of BPEI-3 was very low, and the adhesion was primarily hydrogen bonding based.

While the BPEI copolymers described above achieved significant pull-off strength, experimental analysis revealed that that coupled BPEI copolymer polymeric chains could easily be detached using a peeling mechanism. To achieve this, the BPEI copolymers were heated to about 90 degrees Celsius in the absence of stress, which is a temperature above the glass transition temperature for the crosslinked epoxy SMP backbone, to allow the polymer chains to return to their permanent shape from the temporary shape. The epoxy polymers became flexible due to the modulus drop and due to the transition from the first temporary shape to their relaxed permanent shape, which allowed the two surfaces to be separated via a peeling mechanism with a peeling force less than about 1 N/cm$^2$.

In addition, after detachment, experimental analysis confirmed that the BPEI copolymers could be bonded again (reattached) by returning the polymers to their first temporary shape (by increasing the temperature under stress to achieve the first temporary shape and then cooling the polymers to a temperature below their glass transition temperature) and bringing the polymer chains in close proximity without a significant drop in adhesion strength (a 67% adhesion retention was achieved for the BPEI polymer systems after two bonding-debonding cycles), suggesting the reversible nature and adhesive strength of the polymeric system.

Thus, by simply determining the rigid structure of the SMP polymeric backbones, and the degree of non-covalent interactions achieved by the added side chains, a wide variety of polymeric systems can be designed having significant adhesion strength in the SMP polymers temporary shape and reversible adhesion characteristics when the SMP polymer is heated above its glass transition temperature to its revert to its permanent shape. As shown above, these cycles are repeatable for many coupling and uncoupling cycles, given the reversible nature of the system.

Materials

Diglycidyl ether bisphenol A epoxy monomer (EPON 826) and poly(propylene glycol)bis(2-aminopropyl) ether curing agent (Jeffamine D-230) were obtained from Hexion and Huntsman, respectively. Neopentyl glycol diglycidyl ether (NGDE) was purchased from TCI America. All the other materials including branched poly(ethyleneimine) polymers (BPEI) were purchased from Aldrich. All chemicals were used without further purification.

Material Synthesis

Synthesis of Crosslinked Epoxy Shape Memory Polymer Backbone. 4.68 g of EPON 826 was melted at 80 degrees Celsius and mixed with 1.51 g of NGDE and 2.16 g of Jeffamine D-230. The liquid mixture was degassed under vacuum for 30 minutes, cured under ambient pressure in an aluminum pan at 100 degrees Celsius for 1 hour, and post cured at 130 degrees Celsius for another hour. After cooling to room temperature, the cured epoxy polymers were demolded.

BPEI Surface grafting onto Crosslinked Epoxy Shape Memory Polymer Backbone. Epoxy polymers without being subjected to post cure at 130 degrees Celsius were used. Excess BPEI (50 wt % aqueous solution) was spread onto the epoxy surface and the grafting reaction proceeded at 80 degrees Celsius for 2 hours. Afterwards, the sample was sonicated in methanol for 10 minutes at room temperature, and the process was repeated two more times with fresh methanol. The sample was post cured at 130 degrees Celsius for 1 hour, cut into small pieces, rinsed with isopropanol, and blow dried prior to use.

Adhesive Bonding and Testing

Each adhesive system consists of a pair of polymers. The back (ungrafted) sides of the two polymers were first bonded onto two separate holders using Superglue® and left at room temperature for at least 1 hour. They were then placed in an oven at 90 degrees Celsius for 10 minutes. Immediately after the samples were taken out of the oven, 50 µL of methanol was dropped onto the front (grafted) side of either polymers, onto which the front side of the other polymer was pressed with a preload of 8.3×0.3 N/cm$^2$. The samples were cooled under load for 10 minutes at room temperature. The load was removed and the bonding was formed.

The pull-off force to separate the bonding between the polymers was measured using a ROMULUS Universal Mechanical Strength Tester (Quad Group Inc.) fitted with a homemade ball-joint fixture (see appendix). A pull-off rate of 20 N/s was used unless otherwise noted. The pull-off strength was defined as the force per unit bonding area (N/cm$^2$).

Characterization

The dynamic mechanical analysis (DMA) was conducted in a dual cantilever mode using a DMA Q800 (TA instruments). The testing parameters were: constant frequency=1 Hz; oscillation amplitude=30 µm; heating rate=1 degree Celsius/minute.

The tapping mode atomic force microscopy (AFM) measurement was carried out in ambient air using a Dimension 3100 (VEECO Instruments) with silicon probes (Budget Sensors, Tap 300). The z-range was set to 15 nm and flattened height images are shown in this report.

The x-ray photoelectron spectroscopy (XPS) analysis was conducted using a PHI Quantera Scanning X-ray Microprobe (ULVAC-PHI, Inc). A 200-micrometer-diameter Al Kα x-ray beam was used, with electron and ion neutralizers to compensate for charging. The nitrogen atomic percentages were calculated using the Multipak software.

The above description of embodiments of the invention is merely exemplary in nature and, thus, variations thereof are not to be regarded as a departure from the spirit and scope of the invention.

What is claimed is:

1. A method for reversibly increasing adhesive bond strength for a shape memory polymer chemical system, the method comprising:

providing the shape memory polymer chemical system comprising a first polymer and a second polymer;

grafting at least one first molecular side chain onto a shape memory polymeric backbone of said first polymer;

grafting at least one second molecular side chain onto a shape memory polymeric backbone of said second polymer, said first and second molecular side chains comprising respective molecular hooks and molecular loops adapted to interact non-covalently;

transforming at least one of said first polymer and said second polymer from a permanent shape to a temporary shape, wherein said transformation increases the number of non-covalent interactions between the molecular hooks of said at least one first molecular side chain of said first polymer and the molecular loops of said at least one second molecular side chain of said second polymer when said first polymer is reversibly coupled to said second polymer; and reversibly coupling said first polymer to said second polymer.

2. The method of claim 1, wherein transforming at least one of said first polymer and said second polymer from a permanent shape to a temporary shape comprises:

transforming said first polymer from a first permanent shape to a first temporary shape; and transforming said second polymer from a second permanent shape to a second temporary shape, wherein each of said transformations increases the number of non-covalent interactions between the molecular hooks of said at least one first molecular side chain of said first polymer and the molecular loops of said at least one second molecular side chain of said second polymer.

3. The method of claim 1 further comprising:
grafting at least one second molecular side chain onto a first shape memory polymeric backbone of said first polymer;
grafting at least one first molecular side chain onto a shape memory polymeric backbone of said second polymer;
wherein said transformation increases the number of non-covalent interactions between the molecular hooks of said at least one first molecular side chain of said second polymer and the molecular loops of said at least one second molecular side chain of said first polymer.

4. The method of claim 2, wherein transforming said first polymer from said first permanent shape to said first temporary shape and transforming said second polymer from said second permanent shape to said second temporary shape comprises:
heating said first polymer and said second polymer to a first temperature, wherein said first temperature is greater than a glass transition temperature of each shape memory polymeric backbone of each of said first polymer and said second polymer;
applying a stress to transform said first polymer from said first permanent shape to said first temporary shape;
applying a stress to transform said second polymer from said second permanent shape to said second temporary shape;
cooling said first polymer and said second polymer to a temperature below the glass transition temperature of each shape memory polymeric backbone of each of said first polymer and said second polymer while maintaining said stresses on said first polymer and on said second polymer; and
removing said stresses on said first polymer and on said second polymer.

5. The method of claim 1 wherein the first and second molecular side chains are the same.

6. The method of claim 1 wherein the first and second polymers each comprise the same shape memory polymeric backbone.

7. The method of claim 1 wherein the respective molecular hooks and molecular loops on said first and second molecular side chains are different.

8. A method comprising:
grafting a first molecular side chain having at least one molecular hook onto a shape memory polymeric backbone of a first polymer;
grafting a second molecular side chain having at least one molecular loop onto a shape memory polymeric backbone of a second polymer, each of the molecular hooks being adapted to interact non-covalently with a molecular loop by ionic bonding or hydrogen bonding;
transforming at least one of the first or second polymers from a permanent shape to a temporary shape, wherein the transformation increases the number of non-covalent interactions between the at least one molecular hook and the at least one molecular loop when the first and second polymers are reversibly coupled; and
reversibly coupling the first polymer to the second polymer.

9. The method of claim 8 wherein at least one of the shape memory polymeric backbones comprises an epoxy-based material.

10. The method of claim 8 wherein the first molecular side chain includes at least one of hydrogen bond donors or hydrogen bond acceptors and the second molecular side chain includes at least the other of hydrogen bond donors or hydrogen bond acceptors.

11. The method of claim 8 wherein at least one of the first or second molecular side chains includes a hydrogen atom covalently bonded to a nitrogen atom.

12. The method of claim 8 wherein at least one of the first or second molecular side chains is at least partially ionized.

13. The method of claim 8 wherein each of the first and second molecular side chains includes a polymer that is at least partially ionized and that includes hydrogen bonding donors and acceptors.

14. The method of claim 8 wherein at least one of the first or second molecular side chains includes a polymer and said polymer is attached to the respective shape memory polymeric backbone at more than one location along the side chain.

15. The method of claim 8 wherein the first and second molecular side chains are the same.

16. The method of claim 8 wherein the first and second polymers each comprise the same shape memory polymer backbone composition.

17. The method of claim 8 wherein the first and second molecular side chains each include branched poly(ethyleneimine).

18. The method of claim 8 wherein at least one of the steps of grafting the first molecular side chain or grafting the second molecular side chain comprises a reaction with an epoxy ring of the respective shape memory polymeric backbone.

19. The method of claim 8, wherein each shape memory polymeric backbone is an epoxy-based material that is at least partially crosslinked and includes unreacted epoxy rings; each grafting step includes reacting branched poly(ethyleneimine) molecules with at least some of the unreacted epoxy rings; and the step of reversibly coupling includes heating both of the first and second polymers to a temperature that is above a glass transition temperature of each shape memory polymeric backbone, pressing the grafted portions of the first and second polymers together, and cooling the first and second polymers to a temperature that is below the glass transition temperature of each shape memory polymeric backbone after the pressing begins and before the pressing ends.

* * * * *